(12) United States Patent
Kuravangi-Thammaiah et al.

(10) Patent No.: US 12,557,003 B2
(45) Date of Patent: Feb. 17, 2026

(54) SYSTEMS AND METHODS FOR DEACTIVATING STOLEN USER EQUIPMENT AND A SESSION FOR THE STOLEN USER EQUIPMENT

(71) Applicant: Verizon Patent and Licensing Inc., Basking Ridge, NJ (US)

(72) Inventors: Shanthala Kuravangi-Thammaiah, Keller, TX (US); Kalyani Bogineni, Irving, TX (US); Dante J. Pacella, Charles Town, WV (US); Chris Halton, Park Ridge, NJ (US); Ashish Sardesai, Ashburn, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 292 days.

(21) Appl. No.: 18/460,972

(22) Filed: Sep. 5, 2023

(65) Prior Publication Data
US 2025/0081085 A1 Mar. 6, 2025

(51) Int. Cl.
*H04W 48/02* (2009.01)
*G06F 21/88* (2013.01)
*H04L 41/0823* (2022.01)
*H04W 8/18* (2009.01)
*H04W 60/04* (2009.01)

(52) U.S. Cl.
CPC ............ *H04W 48/02* (2013.01); *G06F 21/88* (2013.01); *H04L 41/0823* (2013.01); *H04W 8/18* (2013.01); *H04W 60/04* (2013.01)

(58) Field of Classification Search
CPC ....... H04W 48/02; H04W 8/18; H04W 60/04; H04L 41/0823
See application file for complete search history.

(56) References Cited

FOREIGN PATENT DOCUMENTS

WO WO2023/147051 * 8/2023 ............. H04W 4/80

OTHER PUBLICATIONS

5G; 5G System; Equipment Identity Register Services; Stage 3, (3GPP TS 29.511 version 16.2.0 Release 16), ETSI TS 129 511 V16.2.0, Jul. 2020, 20 Pages.

* cited by examiner

Primary Examiner — Myron Wyche

(57) ABSTRACT

A network device may receive, from an equipment identity register, a status of a user equipment and a notification indicating that the user equipment is lost or stolen, and may provide, to a unified data management component, a subscription request that includes the status of the user equipment. The network device may receive, from the unified data management component, a subscription for the user equipment based on the subscription request and based on the status of the user equipment, and may provide, to the user equipment, a command to cause the user equipment to update a configuration of the user equipment based on the subscription.

20 Claims, 7 Drawing Sheets

SYSTEMS AND METHODS FOR DEACTIVATING STOLEN USER EQUIPMENT AND A SESSION FOR THE STOLEN USER EQUIPMENT

BACKGROUND

Theft and/or loss of mobile devices (e.g., a user equipment (UE)) has been increasing. Stolen UEs may enable bad actors with illegal access to financial account information and/or user data via financial mobile applications on the stolen or lost UEs.

DETAILED DESCRIPTION OF EXAMPLE EMBODIMENTS

Figure 1A:
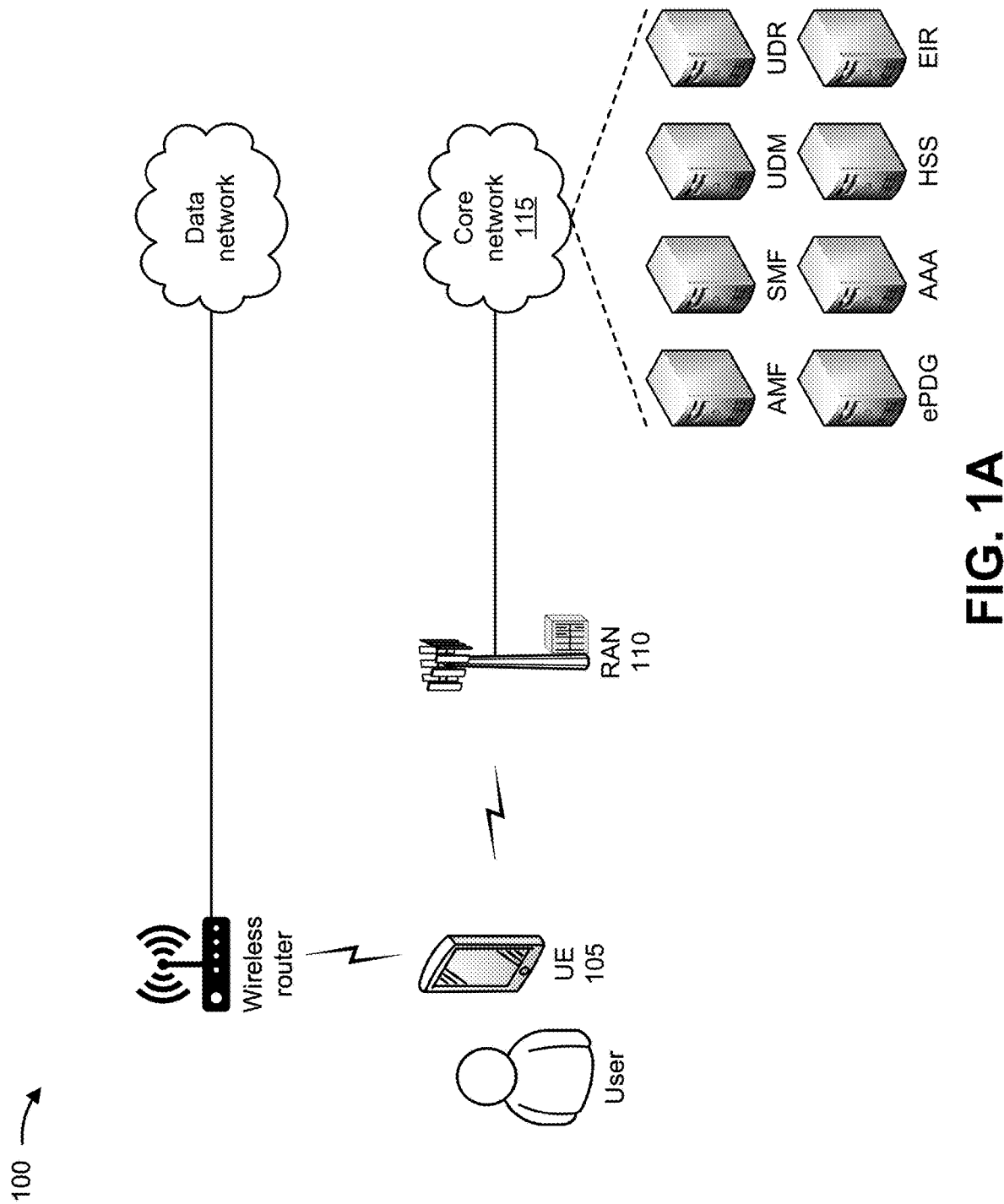
FIGS. 1A-1D are diagrams of an example associated with deactivating a stolen user equipment (UE) and a session for the stolen UE.

The following detailed description of example implementations refers to the accompanying drawings. The same reference numbers in different drawings may identify the same or similar elements.

User equipments (UEs) (e.g., mobile devices) are hubs of user data and applications. If a UE is stolen and a thief is able to retrieve a password for the UE, the thief may utilize the password to perform financial or data theft from an owner of the UE. With high profile data theft, law enforcement may wish to monitor activity of a stolen UE and understand a severity of the data theft without spooking the bad actor and/or to facilitate recovery of the stolen UE. However, current procedures for handling lost or stolen UEs are slow and fail to adequately protect account information from theft. Furthermore, there are no defined procedures associated with how a UE status may be utilized to police activity of a stolen UE if the UE is still active on the network.

Thus, current procedures for protecting data associated with a stolen or lost UE consume computing resources (e.g., processing resources, memory resources, communication resources, and/or the like), networking resources, and/or other resources associated with failing to protect data associated with a stolen or lost UE, handling the repercussions associated with theft of the data, providing a poor user experience for a user of the stolen or lost UE, involving law enforcement and/or financial institutions in attempting to identify a bad actor associated with the stolen or lost UE, and/or the like.

Some implementations described herein provide a device that deactivates a stolen UE and a session for the stolen UE. For example, a device may receive, from an equipment identity register, a status of a UE and a notification indicating that the UE is lost or stolen, and may provide, to a unified data management component, a subscription request that includes the status of the UE. The network device may receive, from the unified data management component, a subscription for the UE based on the subscription request and based on the status of the UE, and may provide, to the UE, a command to cause the UE to update a configuration of the UE based on the subscription.

In this way, the device deactivates a stolen UE and a session for the stolen UE. For example, based on a notification of a compromised UE, the device may perform multiple actions on the UE that is still connected to the network (e.g., curtail services available to compromised UE, change connection capabilities, and/or the like). The device may provide enhanced features for a subscriber data structure, such as defining unique subscription information (e.g., a quarantine slice and basic services) for compromised UE. The device may recognize a status of the UE and may trigger a subscription update for consumer network functions and application servers based on the status. The device may dynamically update the UE's subscription to operator services and access to network capabilities based on the status, and may limit exposure of stolen UE information associated with external parties. Thus, the device may conserve computing resources, networking resources, and/or other resources that would have otherwise been consumed by failing to protect data associated with a stolen or lost UE, handling the repercussions associated with theft of the data, providing a poor user experience for a user of the stolen or lost UE, involving law enforcement and/or financial institutions in attempting to identify a bad actor associated with the stolen or lost UE, and/or the like.

FIGS. 1A-1D are diagrams of an example 100 associated with deactivating a stolen UE and a session for the stolen UE. As shown in FIGS. 1A-1D, example 100 includes a UE 105, a radio access network (RAN) 110, a core network 115, a wireless router, and a data network. Further details of the UE 105, the RAN 110, the core network 115, the wireless router, and the data network are provided elsewhere herein.

As shown in FIG. 1A, the UE 105 may wirelessly connect with the RAN 110 and the wireless router. The RAN 110 may enable the UE 105 to communicate with the core network 115. In some implementations, the RAN 110 may enable the UE 105 to communicate with the data network. The wireless router may enable the UE 105 to communicate with the data network and/or a financial application server. As further shown, the core network 115 may include an access and mobility management function (AMF), a session management function (SMF), a short message service function (SMSF), a unified data management (UDM) component, a unified data repository (UDR), an evolved packet data gateway (ePDG), an authentication, authorization, and accounting (AAA) component, a home subscriber server (HSS), and an equipment identity register (EIR). Further details of the AMF, the SMF, the UDM, the UDR, the ePDG, the AAA, the HSS, and the EIR are provided elsewhere herein.

Figure 1B:
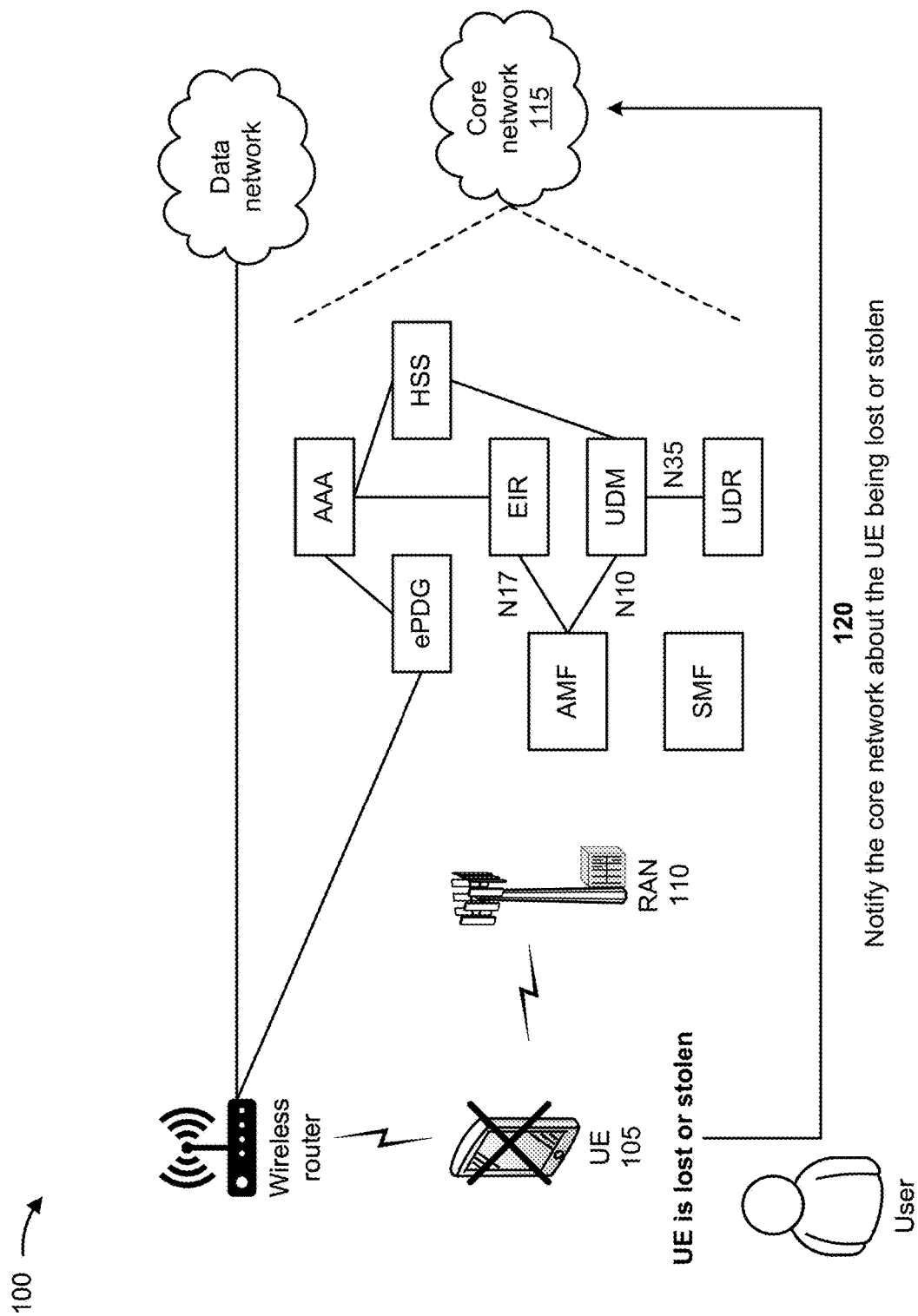

As shown in FIG. 1B, the AMF may connect with the EIR via an interface (e.g., an N17 interface), and may connect with the UDM via an interface (e.g., an N10 interface). The UDM may connect with the UDR via an interface (e.g., an N35 interface). In some implementations, the EIR may provide, to third parties, subscriptions for information associated with a lost or stolen UEs 105. For example, third party application providers (e.g., financial institutions, credit card providers, and/or the like) may provide applications to the UE 105 that may be compromised when the UE 105 is stolen or lost. Such third party application providers may wish to be notified of when the UE 105 is stolen or lost so that they may prevent bad actors from utilizing applications on the stolen or lost UE 105. In some implementations, the EIR may enable provisioning of the UE 105 (e.g., to prevent further theft via applications of the UE 105) after a user of the UE 105 reports the UE 105 as being lost or stolen. In some implementations, the EIR may determine a subscription for the UE 105. The subscription of the UE 105 may include a first subscription (e.g., a blacklisted subscription) that causes the UE 105 to be deregistered from the core network 115 with no service, a second subscription (e.g., a greylisted subscription) that enables the UE 105 to attach to the core network 115 with limited service, a third subscription (e.g., a whitelisted subscription) that causes the UE 105 to be identified as lost or stolen without a loss of service to the core network 115, and/or the like.

In some implementations, the N10 interface (e.g., provided between the AMF and the UDM) may be enhanced to trigger subscription retrieval for the UE 105 based on determining a particular status of the UE 105 (e.g., a grey listed device). In some implementations, the N35 interface (e.g., provided between the UDM and the UDR) may be enhanced to include a status of the UE 105 during a subscription retrieval for the UE 105. In some implementations, the UDR may be enhanced to update a subscription for the UE 105 with greylist subscription or a whitelist subscription.

As further shown in FIG. 1B, the UE 105 may be stolen (or lost). For example, the user of the UE 105 may have the UE 105 stolen or may lose the UE 105. As further shown in FIG. 1B, and by reference number 120, the user of the UE 105 may notify the core network 115 about the UE 105 being lost or stolen. For example, the user of the UE 105 may notify the core network 115 about the stolen or lost UE 105 via a portal provided by the core network 115 or via a customer service call to an operator of the core network 115. In some implementations, the lost or stolen status of the UE 105 may be conveyed (e.g., as subscription-based notifications) to other network operators, corresponding original equipment manufacturers (OEMs), and/or designated applications.

Figure 1C:
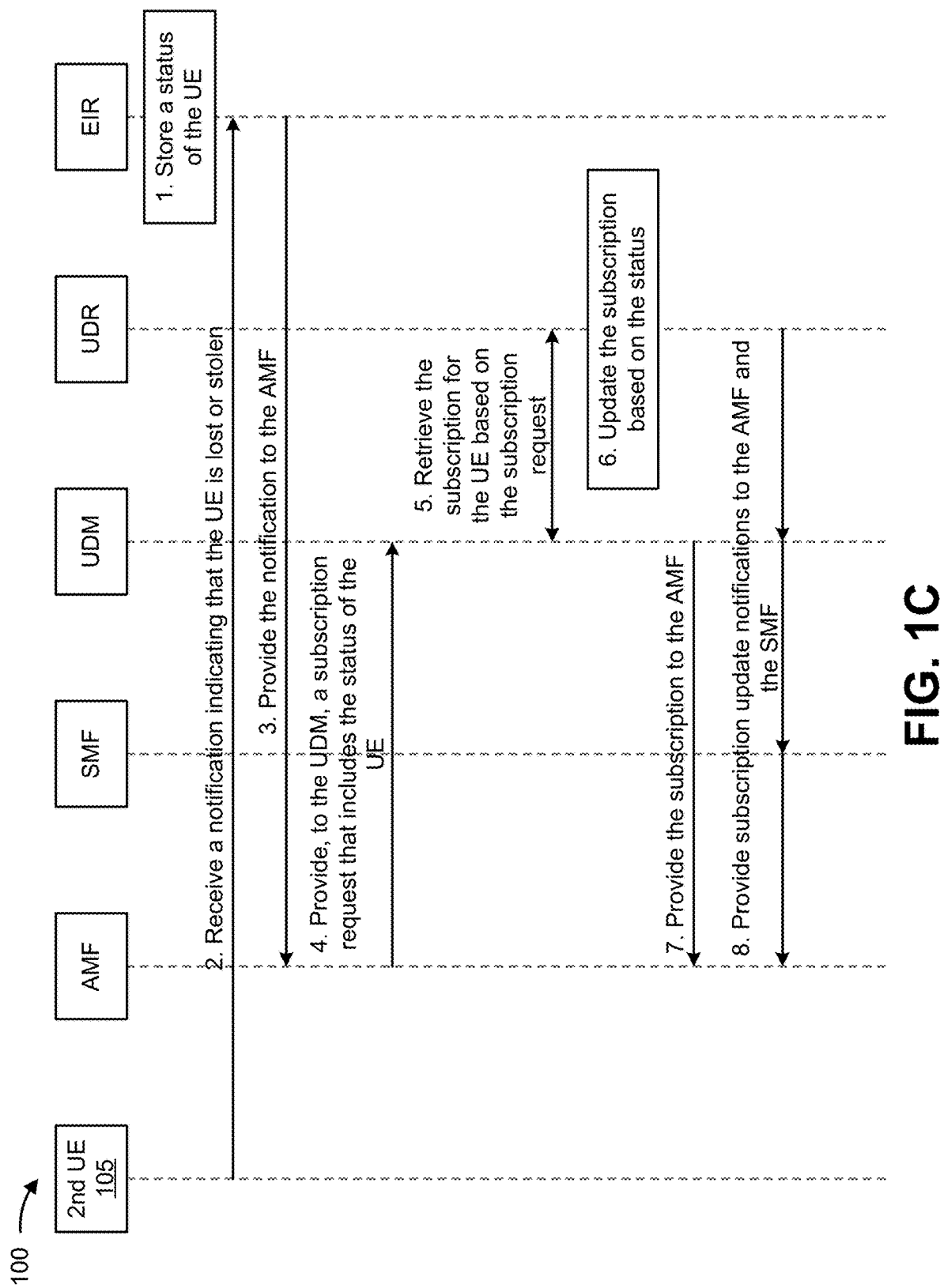
Figure 1D:
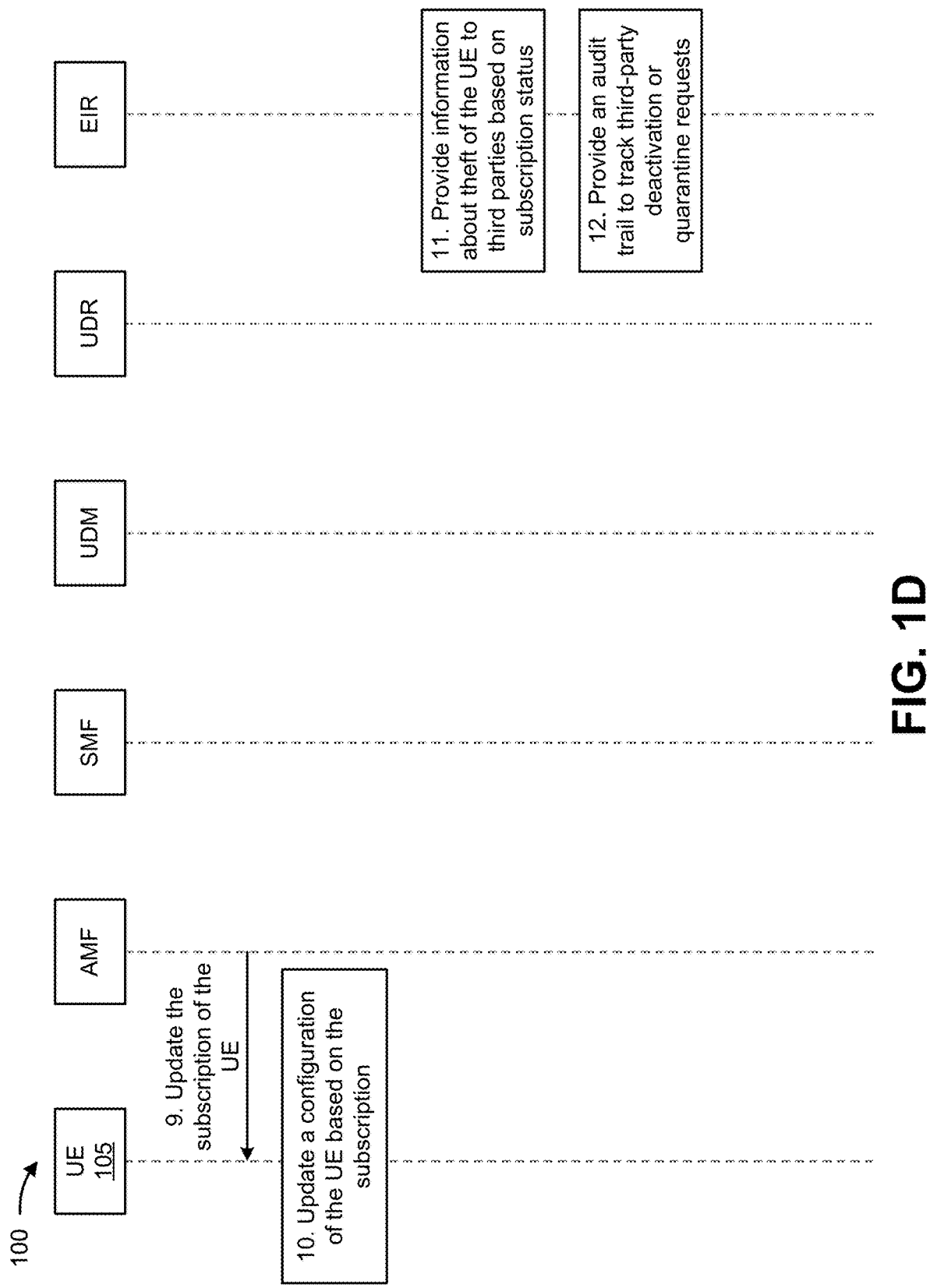

FIGS. 1C and 1D depict a call flow diagram associated with deactivating a stolen UE 105 and a session for the stolen UE 105. As shown at step 1 of FIG. 1C, the EIR may store a status of the UE 105. For example, the EIR may store a permanent equipment identifier (PEI) of the UE 105 and a subscription status (e.g., blacklist, greylist, whitelist, and/or the like) of the UE 105 in a data structure (e.g., a database, a table, a list, and/or the like) associated with the EIR. As shown step 2, the EIR may receive (e.g., from a secondary or companion UE 105) a notification indicating that the UE 105 is lost or stolen. For example, the user of the UE 105 may utilize the secondary UE 105 to notify the core network 115 about the stolen or lost UE 105 via a portal provided by the core network 115 or via a customer service call to an operator of the core network 115. Based on the notice from the user, the core network 115 may generate the notification indicating that the UE 105 is lost or stolen, and may provide the notification to the EIR. The EIR may receive the notification indicating that the UE 105 is lost or stolen from the core network 115 and/or directly from the user of the UE 105.

As shown step 3 of FIG. 1C, the EIR may provide the notification to the AMF. For example, the EIR may provide the status of the UE 105 and the notification indicating that the UE 105 is lost or stolen to the AMF. The AMF may receive the status of the UE 105 and the notification from the EIR (e.g., via the N17 interface). As shown step 4, the AMF may provide, to the UDM, a subscription request that includes the status of the UE 105. For example, the AMF may identify the status of the UE 105 based on receiving the status of the UE 105 and the notification from the EIR, and may generate the subscription request that includes the status of the UE 105 based on identifying the status of the UE 105. The AMF may provide the subscription request that includes the status of the UE 105 to the UDM (e.g., via the N10 interface). In some implementations, the subscription request may include a request for subscription data for the UE 105, a subscription permanent identifier (SUPI) associated with the UE 105, and the status (e.g., blacklist, greylist, whitelist, and/or the like) of the UE 105.

As shown step 5 of FIG. 1C, the UDM may retrieve the subscription for the UE 105 from the UDR based on the subscription request. For example, the UDM may utilize the N35 interface to provide the subscription request to the UDR, and the UDR may receive the subscription request from the UDM. The UDR may utilize the status of the UE 105 (e.g., provided in the subscription request) to retrieve the subscription of the UE 105 from storage. The subscription of the UE 105 may include a first subscription (e.g., a blacklisted subscription) that causes the UE 105 to be deregistered from the core network 115 with no service, a second subscription (e.g., a greylisted subscription) that enables the UE 105 to attach to the core network 115 with limited service, a third subscription (e.g., a whitelisted subscription) that causes the UE 105 to be identified as lost or stolen without a loss of service to the core network 115, and/or the like. In some implementations, the subscription of the UE 105 may prevent the UE 105 from accessing a short message service (SMS), may cause the UE 105 to move to a quarantine network slice (e.g., which provides limited services), may prevent one or more services (e.g., an SMS, a high speed Internet service, a low latency slice, and/or the like) for the UE 105, may modify a connection capability of the UE 105, and/or the like. The UDR may utilize the N35 interface to provide the subscription of the UE 105 to the UDM, and the UDM may receive the subscription of the UE 105 from the UDR.

As shown step 6, the UDR may update the subscription for the UE 105 based on the status of the UE 105. For example, the UDR may utilize the status (e.g., blacklist, greylist, whitelist, and/or the like) of the UE 105 to update the subscription for the UE 105. The UDR may update the subscription for the UE 105 to the first subscription (e.g., a blacklisted subscription) that causes the UE 105 to be deregistered from the core network 115 with no service, the second subscription (e.g., a greylisted subscription) that enables the UE 105 to attach to the core network 115 with limited service, the third subscription (e.g., a whitelisted subscription) that causes the UE 105 to be identified as lost or stolen without a loss of service to the core network 115, and/or the like. As shown step 7, the UDM may provide the subscription to the AMF. For example, the UDM may utilize the N10 interface to provide the subscription for the UE 105 to the AMF, and the AMF may receive the subscription for the UE 105 from the UDM. As shown step 8, the UDM and the UDR may provide subscription update notifications to the AMF and the SMF. For example, the UDM and/or the UDR may generate subscription update notifications indicating that the subscription for the UE 105 has been updated based on the status of the UE 105. The UDM and/or the UDR may provide the subscription update notifications to consumer network functions (e.g., the AMF, the SMF, an SMSF, a network exposure function (NEF), and/or the like) so that the consumer network functions may perform appropriate actions based on the updated subscription for the UE 105. Once the AMF is made aware of a status of the UE 105 (e.g., the subscription for the UE 105), the AMF may store the status of the 105 in context data and may the status of the UE 105 when the AMF exchanges the context data with the SMF. The SMF may inform the PCF and the PCF may retrieve a policy subscription from the UDR based on the status of the UE 105.

As shown step 9 of FIG. 1D, the AMF may update the subscription of the UE 105. For example, the AMF may perform one or more actions based on the updated subscription of the UE 105, such as cause the UE 105 to be deregistered from the core network 115 with no service, enable the UE 105 to attach to the core network 115 with limited service, cause the UE 105 to be identified as lost or stolen without a loss of service to the core network 115, prevent the UE 105 from accessing an SMS, cause the UE 105 to move to a quarantine network slice (e.g., which provides limited services), prevent one or more services (e.g., an SMS, a high speed Internet service, a low latency slice, and/or the like) for the UE 105, modify a connection capability of the UE 105, and/or the like. As shown step 10, the UE 105 may update a configuration of the UE 105 based on the subscription. For example, the UE 105 may update a configuration of the UE 105 to cause the UE 105 to perform one or more actions based on the subscription. In some implementations, the UE 105 may update the configuration to cause the UE 105 to deregister from the core network 115 with no service, attach to the core network 115 with limited service, prevent the UE 105 from accessing an SMS, move to a quarantine network slice (e.g., which provides limited services), prevent one or more services (e.g., an SMS, a high speed Internet service, a low latency slice, and/or the like) for the UE 105, modify a connection capability of the UE 105, and/or the like.

As shown step 11, the EIR may provide information about theft of the UE 105 to third parties based on subscription status. For example, the EIR may provide, to third parties, subscriptions for information associated with a lost or stolen UEs 105. Third party application providers (e.g., financial institutions, credit card providers, and/or the like) may provide applications to the UE 105 that may be compromised when the UE 105 is stolen or lost. Such third party application providers may wish to be notified of when the UE 105 is stolen or lost so that they may prevent bad actors from utilizing applications on the stolen or lost UE 105. The third parties may subscribe to such notifications so that they receive the notifications when the UE 105 is stolen or lost.

As shown step 12, the EIR may provide an audit trail to track third-party deactivation or quarantine requests. For example, the EIR may provide audit capabilities to track any third party requested deactivations or quarantine requests associated with the UE 105. The audit trail may include a blockchain-based audit trail. In some implementations, the audit trail may include information such as the following:

(date & time): device [IMEI] greylisted by [acct/entity]
(date & time): device [IMEI] quarantined by [acct/entity]
(date & time): device [IMEI]/acctname quarantine service 0x001 invoked by [acct/entity]
(date & time): device [IMEI]/acctname quarantine service 0x002 invoked by [acct/entity].

The quarantine services may be registered with the core network 115 and the third parties (e.g., third party application providers) and may be invoked to trace what a bad actor may do for an account takeover. The audit trail may include a legal identifier for when a request is not initiated by an account owner (e.g., the user of the UE 105). This may enable bulk reporting from sanctioned agencies and/or watchdog groups to report how many such requests are being facilitated per reporting period (e.g., "Acct 1234 requested quarantine 34 times this reporting period").

In this way, the device deactivates a stolen UE 105 and a session for the stolen UE 105. For example, based on a notification of a compromised UE 105, the device may perform multiple actions on the UE 105 that is still connected to the network (e.g., curtail services available to compromised UE 105, change connection capabilities, and/or the like). The device may provide enhanced features for a subscriber data structure, such as defining unique subscription information (e.g., a quarantine slice and basic services) for compromised UE 105. The device may recognize a status of the UE 105 and may trigger a subscription update for consumer network functions and application servers based on the status. The device may dynamically update the UE 105's subscription to operator services and access to network capabilities based on the status, and may limit exposure of stolen UE information associated with external parties. In some implementations, the device may provide enhanced features for a subscriber data structure, such as defining unique subscription information (e.g., a quarantine slice and basic services) for a compromised UE 105. The device may provide honeypot services (e.g., isolated network functions, RAN intelligent controller (RIC) applications, as well as higher level services and network elements, including account takeover (ATO) targets, such as financial service application stubbed backends or cloud-based digital wallets/credentials). Such services may be instantiated through the use of a quarantine slice and other network partitioning technologies orchestrated jointly and contiguously to simulate real-world services without risk to actual user data or service/network infrastructure as well as conserving resources.

Thus, the device may conserve computing resources, networking resources, and/or other resources that would have otherwise been consumed by failing to protect data associated with a stolen or lost UE 105, handling the repercussions associated with theft of the data, providing a poor user experience for a user of the stolen or lost UE 105, involving law enforcement and/or financial institutions in attempting to identify a bad actor associated with the stolen or lost UE 105, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
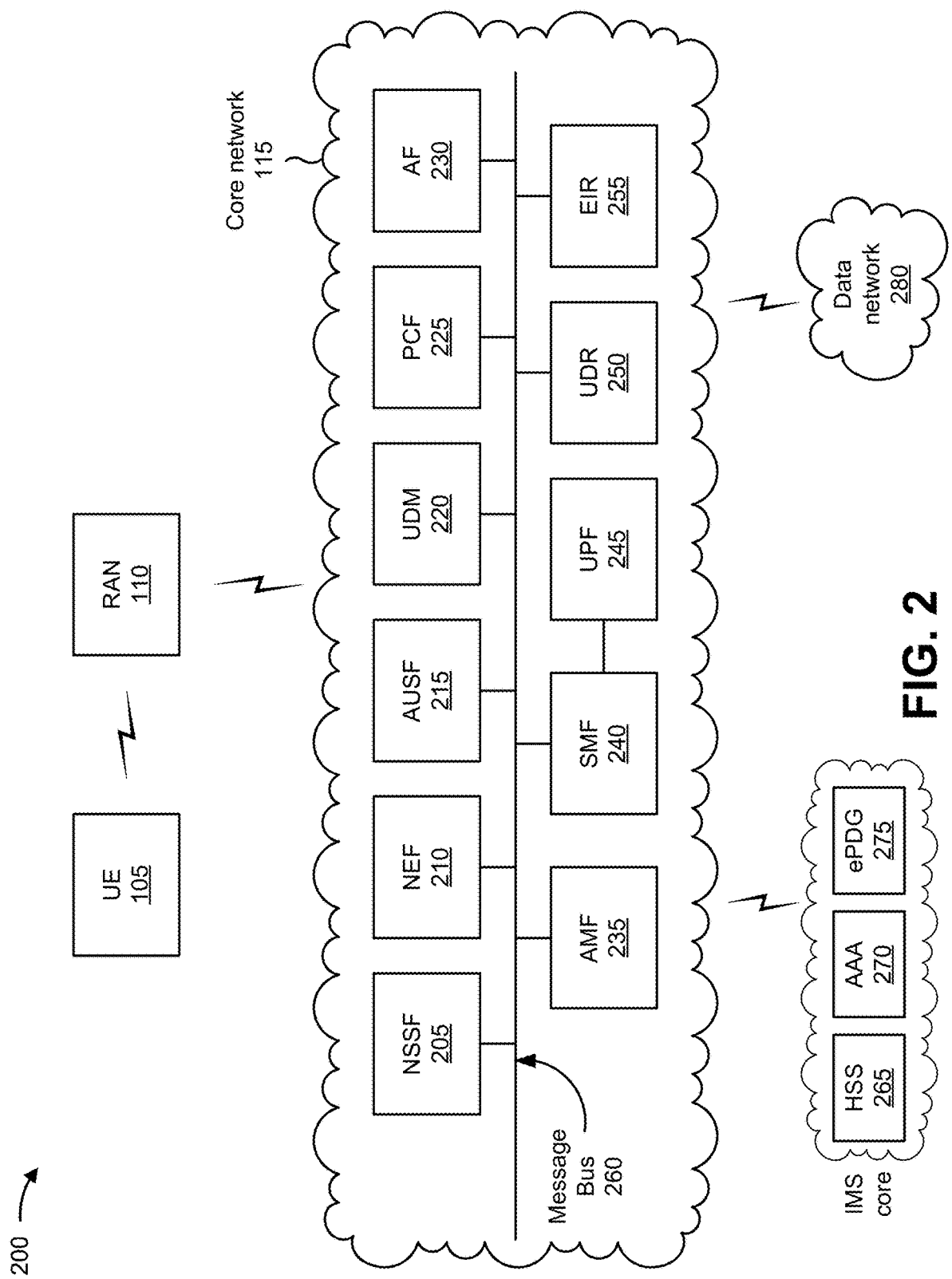
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, an Internet protocol (IP) multimedia subsystem (IMS) core, and a data network 280. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a UDM component 220, a policy control function (PCF) 225, an application function (AF) 230, an AMF 235, an SMF 240, a user plane function (UPF) 245, a UDR 250, and/or an EIR 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM component 220 includes one or more devices that store user data and profiles in the wireless telecommunications system. The UDM component 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment IP address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The UDR 250 includes one or more devices that store data grouped into distinct collections of subscription-related data, such as subscription data, policy data, structured data for exposure, application data, any other designated status, and/or the like. The UDR 250 may make the subscription data available, via the UDM component 220, to a number of network functions (e.g., the AUSF 215, the AMF 235, the SMF 240, and/or the like) that control the UE 105's activities within the network. The UDR 250 may make the policy data to the PCF 225. The application data may be stored in the UDR 250 by the external application function, via the NEF 210, in order to be made available to network functions that require, and are authorized to request, subscription-related data.

The EIR 255 includes one or more devices that supports checking a status of an identity of the UE 105. For example, the EIR 255 may determine whether a PEI of the UE 105. The EIR 255 may mark a subscriber (e.g., the UE 105) as either blacklisted (e.g., where the UE 105 is completely deregistered from the core network 115 with no service), greylisted (e.g., where the UE 105 may continue to attached to the core network 115 with limited service), or whitelisted (e.g., where the UE 105 is marked as stolen but a subscription for the UE 105 is not changed).

The message bus 260 represents a communication structure for communication among the functional elements. In other words, the message bus 260 may permit communication between two or more functional elements.

The IMS core may include an HSS 265, an AAA 270, and/or an ePDG 275, and may manage device registration and authentication, session initiation, and/or other operations associated with the UE 105. The HSS 265, the AAA 270, and/or the ePDG 275 may reside in the core network 115 and/or the IMS core.

The HSS 265 includes one or more devices, such as one or more server devices, capable of managing (e.g., receiving, generating, storing, processing, and/or providing) information associated with the UE 105. For example, the HSS 265 may manage subscription information associated with the UE 105, such as information that identifies a subscriber profile of a user associated with the UE 105, information that identifies services and/or applications that are accessible to the UE 105, location information associated with the UE 105, a network identifier (e.g., a network address) that identifies the UE 105, information that identifies a treatment of the UE 105 (e.g., quality of service information, a quantity of minutes allowed per time period, a quantity of data consumption allowed per time period, etc.), and/or similar information. The HSS 265 may provide this information to one or more other devices of the environment 200 to support the operations performed by those devices.

The AAA 270 includes one or more devices, such as one or more server devices, that perform authentication, authorization, and/or accounting operations for communication sessions associated with the UE 105. For example, the AAA 270 may perform authentication operations for the UE 105 and/or a user of the UE 105 (e.g., using one or more credentials), may control access, by the UE 105, to a service and/or an application (e.g., based on one or more restrictions, such as time-of-day restrictions, location restrictions, single or multiple access restrictions, read/write restrictions, etc.), may track resources consumed by the UE 105 (e.g., a quantity of voice minutes consumed, a quantity of data consumed, etc.), and/or may perform similar operations.

The ePDG 275 includes one or more devices that provides the UE 105 with access to domain services. For example, the ePDG 275 may include one or more data processing and/or traffic transfer devices, such as a gateway, a router, a modem, a switch, a firewall, a network interface card (NIC), a hub, a bridge, a server device, an optical add-drop multiplexer (OADM), or any other type of device that processes and/or transfers traffic. The ePDG 275 may perform functions, such as IP address management, support for mobile IP, quality of service (QOS) enforcement, lawful intercept and security, and/or the like.

The data network 280 includes one or more wired and/or wireless data networks. For example, the data network 280 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
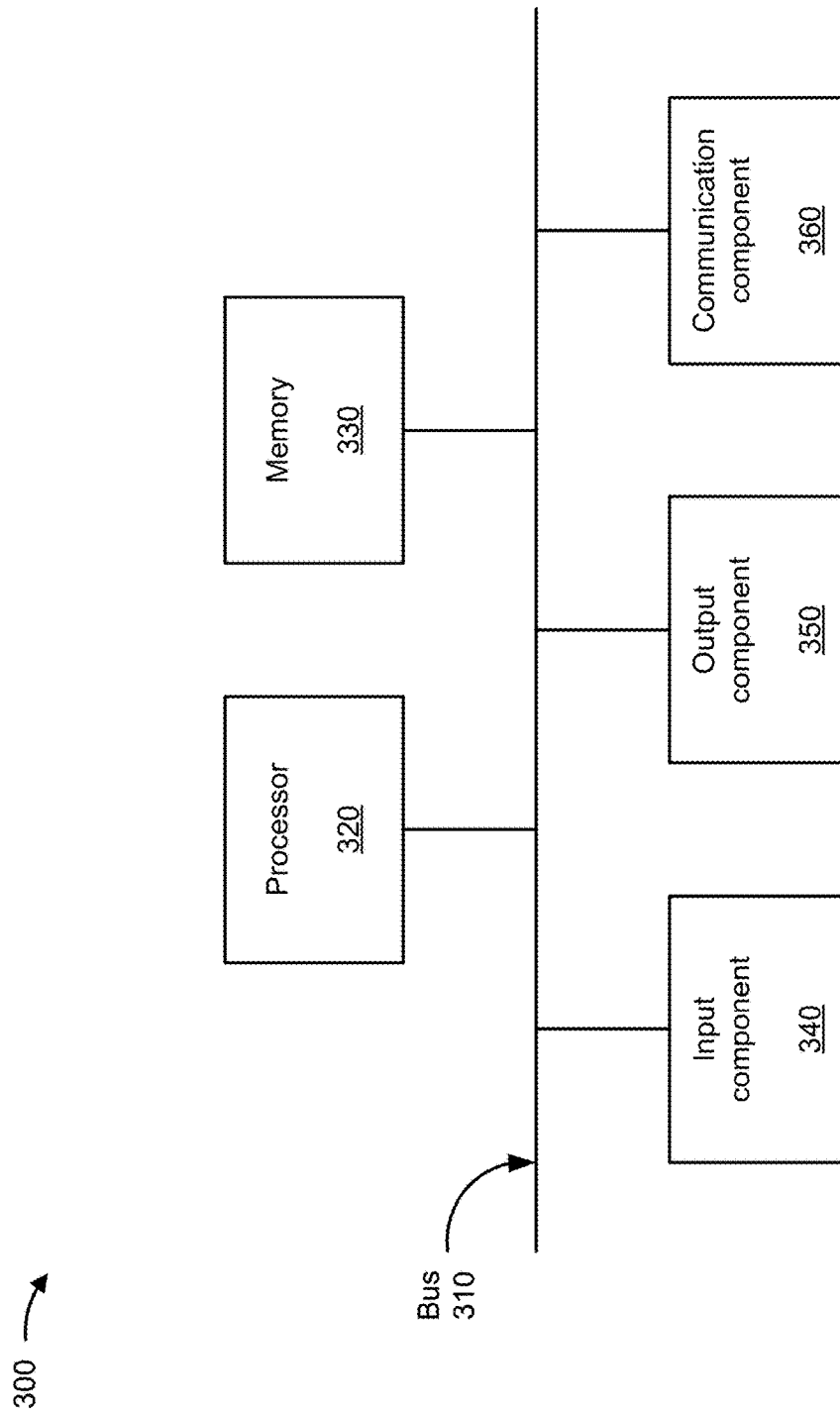
FIG. 3 is a diagram of example components of one or more devices of FIG. 2.

FIG. 3 is a diagram of example components of a device 300, which may correspond to the UE 105, the RAN 110, the NSSF 205, the NEF 210, the AUSF 215, the UDM component 220, the PCF 225, the AF 230, the AMF 235, the SMF 240, the UPF 245, the UDR 250, the EIR 255, the HSS 265, the AAA 270, and/or the ePDG 275. In some implementations, the UE 105, the RAN 110, the NSSF 205, the NEF 210, the AUSF 215, the UDM component 220, the PCF 225, the AF 230, the AMF 235, the SMF 240, the UPF 245, the UDR 250, the EIR 255, the HSS 265, the AAA 270, and/or the ePDG 275 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
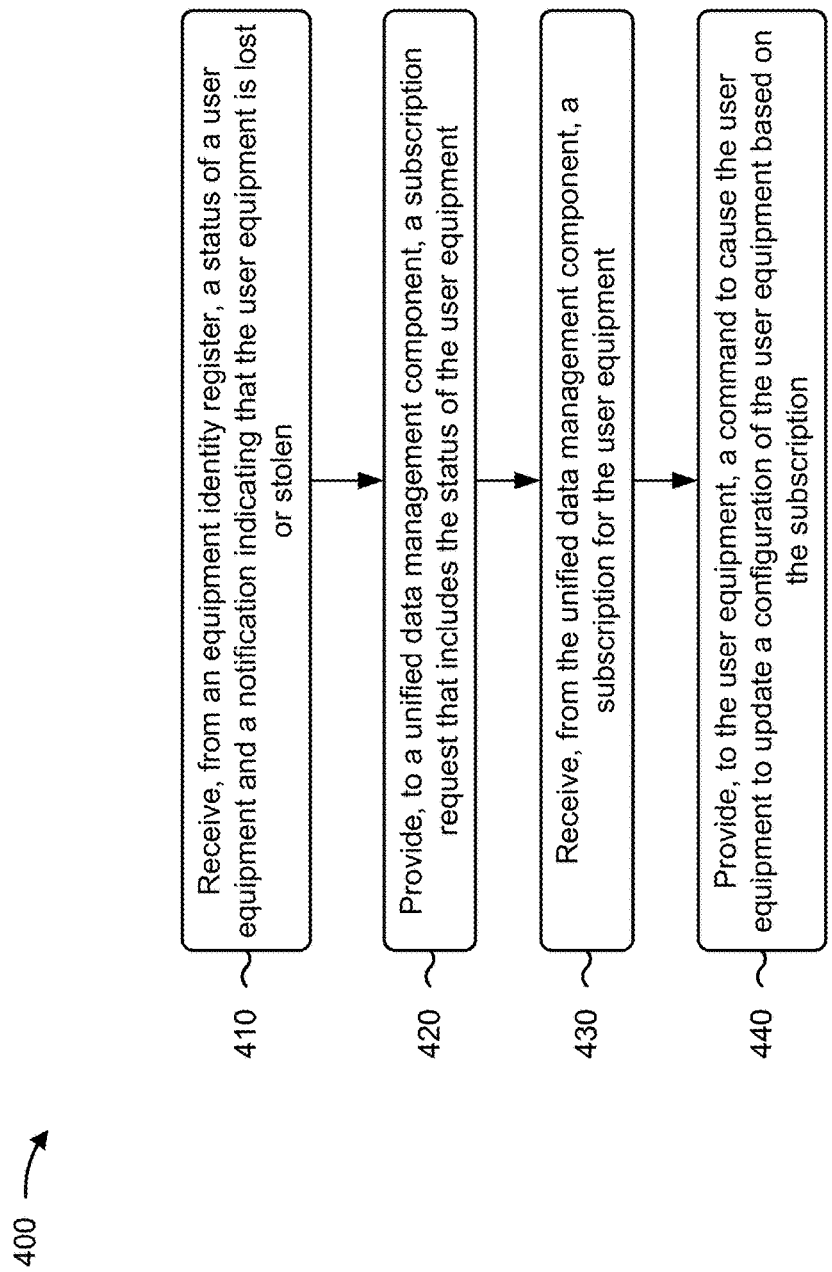
FIG. 4 is a flowchart of an example process for deactivating a stolen UE and a session for the stolen UE.

FIG. 4 is a flowchart of an example process 400 for deactivating a stolen UE 105 and a session for the stolen UE 105. In some implementations, one or more process blocks of FIG. 4 may be performed by a device (e.g., the AMF 235). In some implementations, one or more process blocks of FIG. 4 may be performed by another device or a group of devices separate from or including the device, such as an EIR (e.g., the EIR 255), a UDM component (e.g., the UDM component 220), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from an EIR, a status of a UE and a notification indicating that the UE is lost or stolen (block 410). For example, the network device may receive, from an EIR, a status of a UE and a notification indicating that the UE is lost or stolen, as described above. In some implementations, the EIR is configured to store the status of the UE. In some implementations, the network device is an AMF. In some implementations, the EIR is configured to provide information indicating a loss or a theft of the UE to third parties. In some implementations, the EIR is configured to provide an audit trail to track third-party deactivation or quarantine requests. In some implementations, the audit trail is a blockchain-based audit trail.

As further shown in FIG. 4, process 400 may include providing, to a UDM component, a subscription request that includes the status of the UE (block 420). For example, the network device may provide, to a UDM component, a subscription request that includes the status of the UE, as described above.

As further shown in FIG. 4, process 400 may include receiving, from the UDM component, a subscription for the UE (block 430). For example, the network device may receive, from the UDM component, a subscription for the UE based on the subscription request and based on the status of the UE, as described above. In some implementations, the UDM component is configured to retrieve the subscription for the UE from a UDR based on the subscription request. In some implementations, a UDR, associated with the UDM component, is configured to update the subscription for the UE based on the status of the UE. In some implementations, the subscription of the UE is one of a first subscription that causes the UE to be deregistered from the network with no service, a second subscription that enables the UE to attach to the network with limited service, or a third subscription that causes the UE to be identified as lost or stolen.

In some implementations, the subscription prevents the UE from accessing a short message service. In some implementations, the subscription causes the UE to move to a quarantine network slice. In some implementations, the subscription prevents one or more services for the UE or modifies a connection capability of the UE.

As further shown in FIG. 4, process 400 may include providing, to the UE, a command to cause the UE to update a configuration of the UE based on the subscription (block 440). For example, the network device may provide, to the UE, a command to cause the UE to update a configuration of the UE based on the subscription, as described above.

In some implementations, process 400 includes receiving, from the UDM component, subscription update notifications for the UE based on the subscription request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device of a network and from an equipment identity register, a status of a user equipment and a notification indicating that the user equipment is lost or stolen;
   providing, by the network device and to a unified data management component, a subscription request that includes the status of the user equipment;
   receiving, by the network device and from the unified data management component, a subscription for the user equipment based on the subscription request and based on the status of the user equipment; and
   providing, by the network device and to the user equipment, a command to cause the user equipment to update a configuration of the user equipment based on the subscription.

2. The method of claim 1, wherein the subscription causes the user equipment to move to a quarantine network slice.

3. The method of claim 1, wherein the unified data management component is configured to retrieve the subscription for the user equipment from a unified data repository based on the subscription request.

4. The method of claim 1, wherein a unified data repository, associated with the unified data management component, is configured to update the subscription for the user equipment based on the status of the user equipment.

5. The method of claim 1, further comprising:
   receiving, from the unified data management component, subscription update notifications for the user equipment based on the subscription request.

6. The method of claim 1, wherein the network device is an access and mobility management function.

7. The method of claim 1, wherein the subscription of the user equipment is one of:
   a first subscription that causes the user equipment to be deregistered from the network with no service,
   a second subscription that enables the user equipment to attach to the network with limited service, or
   a third subscription that causes the user equipment to be identified as lost or stolen.

8. A network device of a network, the network device comprising:
   one or more processors configured to:
   receive, from an equipment identity register, a status of a user equipment and a notification indicating that the user equipment is lost or stolen,
   wherein the network device is an access and mobility management function;
   provide, to a unified data management component, a subscription request that includes the status of the user equipment;
   receive, from the unified data management component, a subscription for the user equipment based on the subscription request and based on the status of the user equipment; and
   provide, to the user equipment, a command to cause the user equipment to update a configuration of the user equipment based on the subscription.

9. The network device of claim 8, wherein the subscription prevents the user equipment from accessing a short message service.

10. The network device of claim 8, wherein the subscription causes the user equipment to move to a quarantine network slice.

11. The network device of claim 8, wherein the subscription prevents one or more services for the user equipment or modifies a connection capability of the user equipment.

12. The network device of claim 8, wherein the equipment identity register is configured to provide information indicating a loss or a theft of the user equipment to third parties.

13. The network device of claim 8, wherein the equipment identity register is configured to provide an audit trail to track third-party deactivation or quarantine requests.

14. The network device of claim 13, wherein the audit trail is a blockchain-based audit trail.

15. A non-transitory computer-readable medium storing a set of instructions, the set of instructions comprising:
   one or more instructions that, when executed by one or more processors of a network device of a network, cause the network device to:
   receive, from an equipment identity register, a status of a user equipment and a notification indicating that the user equipment is lost or stolen;
   provide, to a unified data management component, a subscription request that includes the status of the user equipment;
   receive, from the unified data management component, a subscription for the user equipment based on the subscription request and based on the status of the user equipment;
   receive, from the unified data management component, subscription update notifications for the user equipment based on the subscription request; and
   provide, to the user equipment, a command to cause the user equipment to update a configuration of the user equipment based on the subscription.

16. The non-transitory computer-readable medium of claim 15, wherein the unified data management component is configured to retrieve the subscription for the user equipment from a unified data repository based on the subscription request.

17. The non-transitory computer-readable medium of claim 15, wherein a unified data repository, associated with the unified data management component, is configured to update the subscription for the user equipment based on the status of the user equipment.

18. The non-transitory computer-readable medium of claim 15, wherein the subscription of the user equipment is one of:
   a first subscription that causes the user equipment to be deregistered from the network with no service,
   a second subscription that enables the user equipment to attach to the network with limited service, or
   a third subscription that causes the user equipment to be identified as lost or stolen.

19. The non-transitory computer-readable medium of claim 15, wherein the subscription prevents the user equipment from accessing a short message service, causes the user equipment to move to a quarantine network slice, prevents one or more services for the user equipment, or modifies a connection capability of the user equipment.

20. The non-transitory computer-readable medium of claim 15, wherein the equipment identity register is configured to provide information indicating a loss or a theft of the user equipment to third parties.

* * * * *